United States Patent
Russo et al.

(10) Patent No.: US 9,535,835 B2
(45) Date of Patent: Jan. 3, 2017

(54) NON-VOLATILE CACHE

(75) Inventors: Leonard E. Russo, Tomball, TX (US); Walter A. Gaspard, Magnolia, TX (US); Walter W. Bellamy, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 732 days.

(21) Appl. No.: 13/639,514

(22) PCT Filed: Apr. 12, 2010

(86) PCT No.: PCT/US2010/030751
§ 371 (c)(1),
(2), (4) Date: Oct. 5, 2012

(87) PCT Pub. No.: WO2011/129808
PCT Pub. Date: Oct. 20, 2011

(65) Prior Publication Data
US 2013/0067149 A1    Mar. 14, 2013

(51) Int. Cl.
G06F 12/08    (2016.01)
G06F 21/33    (2013.01)

(52) U.S. Cl.
CPC ....... G06F 12/0802 (2013.01); G06F 12/0866 (2013.01); G06F 12/0891 (2013.01); G06F 21/33 (2013.01); G06F 2212/222 (2013.01); G06F 2221/2143 (2013.01)

(58) Field of Classification Search
CPC .. G06F 12/0866; G06F 12/0891; G06F 21/31; G06F 21/33; G06F 21/62; G06F 221/2143
USPC ....................................................... 711/103
See application file for complete search history.

(56) References Cited

U.S. PATENT DOCUMENTS

| | | | |
|---|---|---|---|
| 6,529,416 B2 | 3/2003 | Bruce et al. | |
| 7,340,593 B2 | 3/2008 | Martin | |
| 7,441,084 B2 | 10/2008 | Henshaw et al. | |
| 2003/0196100 A1* | 10/2003 | Grawrock et al. | 713/193 |
| 2007/0162693 A1 | 7/2007 | Nam | |
| 2008/0082743 A1 | 4/2008 | Hanebutte et al. | |
| 2008/0162784 A1 | 7/2008 | Obereiner et al. | |
| 2009/0100216 A1 | 4/2009 | Han | |
| 2009/0182930 A1* | 7/2009 | Taguchi et al. | 711/100 |
| 2010/0077197 A1 | 3/2010 | Ergan et al. | |
| 2010/0082898 A1 | 4/2010 | Mangold | |

FOREIGN PATENT DOCUMENTS

WO    WO-2005006196    1/2005

OTHER PUBLICATIONS

ISA/KR, International Search Report mailed Dec. 30, 2010, PCT/US2010/030751 filed Apr. 12, 2010.
Timothy Brisson et al, "Flushing Policies for NVCache Enabled Hard Disks", University of California, 24th IEEE Conference on Mass Storage Systems (MSST 2007), p. 299-304.

* cited by examiner

*Primary Examiner* — Charles Rones
*Assistant Examiner* — Andrew Russell
(74) *Attorney, Agent, or Firm* — HP Patent Department (57) ABSTRACT

A method for managing a storage device including determining whether the storage device includes a non-volatile cache, scanning for a clear cache instruction received from a computing machine, and clearing the non-volatile cache on the storage device in response to authenticating the clear cache instruction.

13 Claims, 6 Drawing Sheets

NON-VOLATILE CACHE

BACKGROUND

When managing one or more files on a storage device, a user initially couples the storage device to a machine. The user then accesses the storage device on the machine using one or more input devices and proceeds to view one or more files on the storage device. The user can then utilize one or more of the input devices to access, write, and/or delete one or more of the files on the storage device.

BRIEF DESCRIPTION OF THE DRAWINGS

Various features and advantages of the disclosed embodiments will be apparent from the detailed description which follows, taken in conjunction with the accompanying drawings, which together illustrate, by way of example, features of the embodiments.

DETAILED DESCRIPTION

Figure 1:
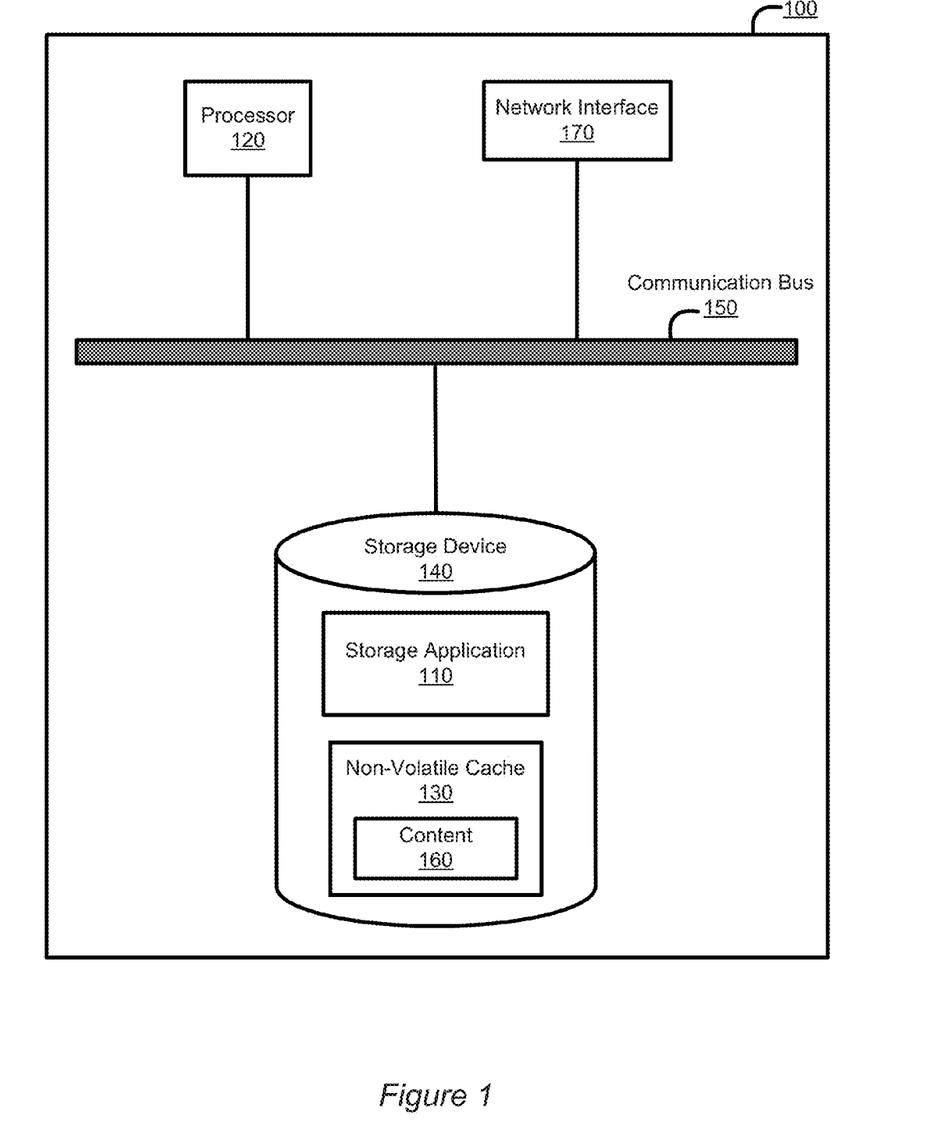
FIG. 1 illustrates a storage device coupled to a computing machine according to an embodiment of the invention.

FIG. 1 illustrates a storage device 140 coupled to a computing machine 100 according to an embodiment of the invention. In one embodiment, the computing machine 100 is a desktop, a laptop, a server, and/or any device that a storage device 140 can be coupled to. As illustrated in FIG. 1, the computing machine 100 is coupled to the storage device 140 and includes a processor 120, a network interface 170, and a communication bus 150 for the machine 100 and/or one or more components of the machine 100 to communicate with one another.

Further, as illustrated in FIG. 1, the storage device 140 stores a storage application 110 and includes a non-volatile cache 130. Further, the storage device 140 and the non-volatile cache 130 can include one or more content 160. In other embodiments, the computing machine 100 includes additional components and/or is coupled to additional components in addition to and/or in lieu of those noted above and illustrated in FIG. 1.

As noted above, the computing machine 100 includes a processor 120. The processor 120 sends data and/or instructions to the components of the computing machine 100, such as the storage device 140, the network interface 170, and the storage application 110. Additionally, the processor 120 receives data and/or instruction from components of the computing machine 100, such as the storage application 110 and the storage device 140.

The storage application 110 is an application which can be configured by the processor 120 to manage the storage device 140 and content 160 included on the storage device 140. When managing the storage device 140, the processor 120 sends one or more instruction for the storage application 110 to scan the storage device 140 and determine whether the storage device 140 includes a non-volatile cache 130. For the purposes of this application, the storage device 140 is a component or device which can couple to the computing machine 100 and be configured to store one or more content 160. Further, the storage device 140 can include one or more non-volatile cache.

For the purposes of this application, a non-volatile cache 130 is an area or section of the storage device 140 which includes non-volatile memory. Additionally, as noted above, one or more content 160 can be included and/or stored on the storage device 140 and/or on a non-volatile cache 130. One or more content 160 can include user data, media files, and/or system files.

If the processor 120 and/or the storage application 110 determine that the storage device 140 includes a non-volatile cache 130, the storage application 110 can proceed to scan for a clear cache instruction received from the computing machine 100, a component or device of the computing machine 100 and/or another computing machine. If a clear cache instruction is found, the storage application 110 can proceed to authenticate the clear cache instruction and the processor 120 can execute the clear cache instruction. When executing the clear cache instruction, one or more content 160 on the non-volatile cache 130 can be cleared. In another embodiment, one or more content 160 on the storage device 140 can be cleared.

The storage application 110 can be firmware which is embedded onto the computing machine 100 and/or the storage device 140. In another embodiment, the storage application 110 is a software application stored on the computing machine 100 within ROM or on the storage device 140 accessible by the computing machine 100. In other embodiments, the storage application 110 is stored on a computer readable medium readable and accessible by the computing machine 100 or the storage device 140 from a different location.

Additionally, in one embodiment, the storage device 140 is included in the computing machine 100. In other embodiments, the storage device 140 is not included in the computing machine 100, but is accessible to the computing machine 100 utilizing a network interface 170 included in the computing machine 100. The network interface 170 can be a wired or wireless network interface card. In other embodiments, the storage device 140 can be configured to couple to one or more ports or interfaces on the computing machine 100 wirelessly or through a wired connection.

In a further embodiment, the storage application 110 is stored and/or accessed through a server coupled through a local area network or a wide area network. The storage application 110 communicates with devices and/or components coupled to the computing machine 100 physically or wirelessly through a communication bus 150 included in or attached to the computing machine 100. In one embodiment the communication bus 150 is a memory bus. In other embodiments, the communication bus 150 is a data bus.

As noted above, the storage application 110 is an application which can be configured by the processor 120 to determine whether the storage device 140 includes a non-volatile cache 130. The processor 120 can send one or more instructions for the storage application 110 to access the storage device 140 and scan the storage device 140 for a cache. A cache is a component or an area of the storage device 140 configured to store one or more content 160 which can later be access by the storage device 140 or the computing machine 100.

The component and/or the area of the storage device 140 can be labeled by the storage device 140, a user, and/or a manufacturer of the storage device 140 to be a cache. Once the storage application 110 has located one or more caches on the storage device 140, the storage application 110 can proceed to determine whether one or more of the caches are a non-volatile cache 130. As noted above, a non-volatile cache 130 is an area of the storage device 140 configured to include non-volatile memory. In one embodiment, the non-volatile cache 130 is a media cache configured to store one or more content 160.

When determining whether a cache is a non-volatile cache 130, the processor 120 and/or the storage application 110 can scan a cache for a label. The label can identify the cache to be a non-volatile cache 130. Additionally, the label can be stored as a header file or any other additional file. In another embodiment, the processor 120 and/or the storage application 110 can determine whether a cache includes non-volatile memory. If the cache includes non-volatile memory or if the cache is labeled to be a non-volatile cache 130, the processor 120 and/or the storage application 110 will determine that the storage device 140 includes a non-volatile cache 130.

Once the processor 120 and/or the storage application 110 has determined that the storage device 140 includes a non-volatile cache 130, the processor 120 and/or the storage application 110 can proceed to scan for a clear cache instruction. A clear cache instruction is a command or instruction which can be executed by the processor 120 and/or by the storage application 110 on the storage device 140. In one embodiment, the clear cache instruction can be encrypted and/or locked.

When executed, the clear cache instruction will clear the non-volatile cache 130 of one or more content 160 found on the non-volatile cache 130. In another embodiment, the clear cache instruction can additionally clear content found on areas of the storage device 140 outside of the non-volatile cache 130.

The clear cache instruction can be sent by the computing machine 100 and/or from another device coupled to the computing machine 100. Additionally, the clear cache instruction is stored on an area of the storage device 140 outside of the non-volatile cache 130. In other embodiments, the clear cache instruction can be stored on additional locations accessible to the storage application 110 and/or the storage device 140 in addition to and/or in lieu of those noted above.

If a clear cache instruction is found, in one embodiment, the processor 120 and/or the storage application 110 will attempt to authenticate the clear cache instruction before executing it. When authenticating the clear cache instruction, the processor 120 and/or the storage application 110 will scan for a security key and proceed to authenticate the clear cache instruction using the security key.

A security key includes a software or hardware security device configured to authorize the execution of the clear cache instruction. The security key can include an encrypted block of data which can be used to decrypt and authenticate the clear cache instruction. Additionally, the security key can include one or more sequence of numbers and/or characters. In another embodiment, the security key can include one or more algorithms.

In other embodiments, the security key can include a software token, a hardware token, and/or any additional software security device which can be utilized to authenticate the clear cache instruction. The security key can be sent from the computing machine 100 and/or from another computing machine or device coupled to the computing machine 100. Additionally, the security key can be stored on the non-volatile cache 130 or on another location on the storage device 140.

Once the clear cache instruction has been authenticated by the security key, the processor 120 and/or the storage application 110 can proceed to execute the clear cache instruction and clear the non-volatile cache 130. In another embodiment, the processor 120 and/or the storage application 110 can additionally scan the non-volatile cache 130 for content 160 before clearing the non-volatile cache 130. When scanning the non-volatile cache 130, the storage application 110 can scan all of the spaces and/or sectors on the non-volatile cache 130 to determine whether any content 160 is found in the non-volatile cache 130.

One or more content 160 are files which can be stored and accessed from the storage device 140 and/or from the non-volatile cache 130. Additionally, one or more of the content 160 can be received from the storage device 140, the computing machine 100, and/or another device coupled to the storage device 140 or the computing machine 100. As noted above, one or more of the content 160 can include user data, media files, and/or system files. In one embodiment, one or more of the content 160 additionally does not include an instruction. In other embodiments, one or more of the content 160 can include or exclude additional files or file types in addition to and/or in lieu of those noted above.

If content 160 is found on the non-volatile cache 130, the processor 120 and/or the storage application 110 can proceed to clear the non-volatile cache 130. In one embodiment, when clearing the content 160 from the storage device 140 and/or from the non-volatile cache 130, any content 160 found on the non-volatile cache 130 and/or found on the storage device 140 will be deleted or purged. In another embodiment, when clearing the content 160, any content 160 found on the non-volatile cache 130 and/or found on the storage device 140 will be overwritten.

In another embodiment, if no content 160 is found on the non-volatile cache 130, the processor 120 and/or the storage application 110 can proceed to scan the storage device 140 for one or more content 160 stored outside of the non-volatile cache 130. If any content 160 is found outside of the non-volatile cache 130, the processor 120 and/or the storage application 110 can then configure the storage device 140 to delete one or more of the content 160. In other embodiments, the processor 120 and/or the storage application 110 can delete one or more content 160 found on the storage device 140 if the storage device 140 does not include one or more non-volatile cache 130.

Figure 2:
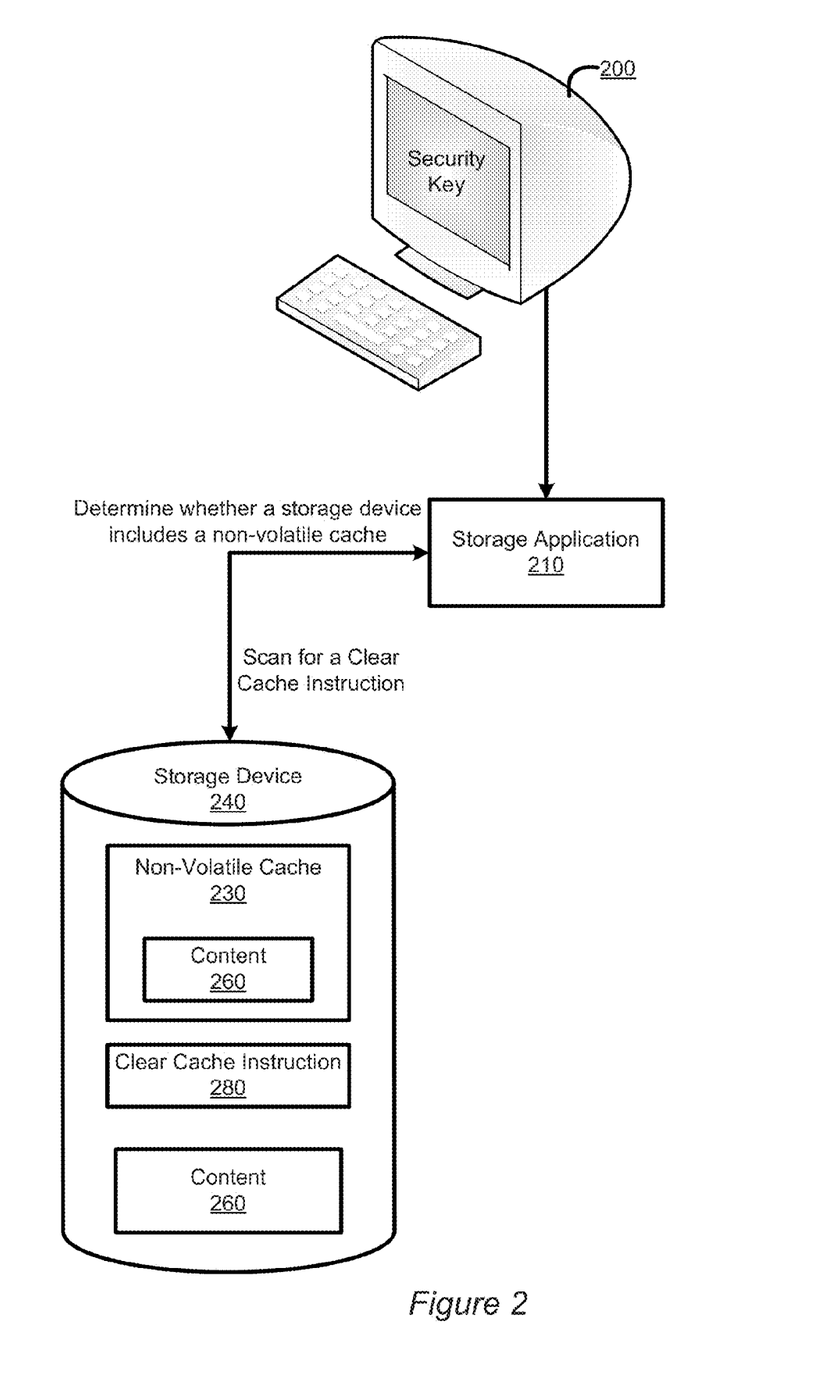
FIG. 2 illustrates a storage application scanning for a non-volatile cache and a clear cache instruction according to an embodiment of the invention.

FIG. 2 illustrates a storage application 210 scanning for a non-volatile cache 230 and a clear cache instruction 280 according to an embodiment of the invention. As noted above, a storage device 240 is a component and/or device which can be configured to store one or more content 260 and can include one or more cache. Additionally, as illustrated in FIG. 2, in one embodiment, the storage device 240 is not included in a computing machine 200, but can be coupled to the computing machine 200 wirelessly or through a wired connection.

As illustrated in FIG. 2, the storage device 240 can include one or more caches. As noted above, a processor of the computing machine 200 can send one or more instructions for a storage application 210 to access the storage device 240 and scan the storage device 240 to determine whether the storage device 240 includes one or more non-volatile cache 230. As shown in the present embodiment, the storage application 210 has scanned the storage device 240 and identified that the storage device 240 includes a cache 230.

As shown in FIG. 2, once a cache 230 is found on the storage device 240, the storage application 210 will proceed to determine whether the cache is a non-volatile cache 230. As noted above, a cache can be labeled by a user, the computing machine 200, and/or by a manufacturer of the storage device 240 to be a non-volatile cache 230. The label can be stored as a header file and/or any additional file on the storage device 240. In another embodiment, the storage application 210 can access the cache and determine whether the cache includes non-volatile memory. The non-volatile memory can include flash memory, NAND memory, and/or a hard disc. In other embodiments, the non-volatile memory can include additional forms of memory in addition to and/or in lieu of those noted above.

If the cache is labeled as a non-volatile cache or if the cache includes non-volatile memory, then the storage application 210 will identify the cache as a non-volatile cache 230. Once the storage application 210 has identified the cache as a non-volatile cache 230, the storage application 210 can proceed to scan for a clear cache instruction 280 received from the computing machine 200 or from another device coupled to the computing machine 200. In another embodiment, the storage application 210 scans for a clear cache instruction 280 before or while determining whether the storage device 240 includes a non-volatile cache 230.

As noted above, the clear cache instruction 280 is an instruction and/or command executable by the processor or the storage application 210 to clear content from the non-volatile cache 230. In another embodiment, when executing the clear cache instruction 280, the storage application 210 additionally searches the storage device 240 for content 260 outside of the non-volatile cache 230 and proceeds to clear content 260 from the storage device 240.

As shown in the present embodiment, the clear cache instruction 280 can be stored on the storage device 240. Additionally, as noted above, the clear cache instruction 280 is stored on an area of the storage device 240 outside of the non-volatile cache 230. In other embodiments, the clear cache instruction 280 can be stored on additional locations and/or on additional devices in addition to and/or in lieu of those noted above and illustrated in FIG. 2.

In one embodiment, before executing the clear cache instruction 280, the storage application 210 and/or the processor can proceed to authenticate the clear cache instruction 280 with a security key. Once the clear cache instruction 280 has been authenticated, the storage application 210 can proceed to manage the storage device 240 and content 260 on the storage device 240.

As noted above, when managing the storage device 240 and the content 260 on the storage device 240, the storage application 210 clears content 260 from the non-volatile cache 230 and/or from areas of the storage device 240 outside of the non-volatile cache 230 in response to authenticating the clear cache instruction 280.

Figure 3:
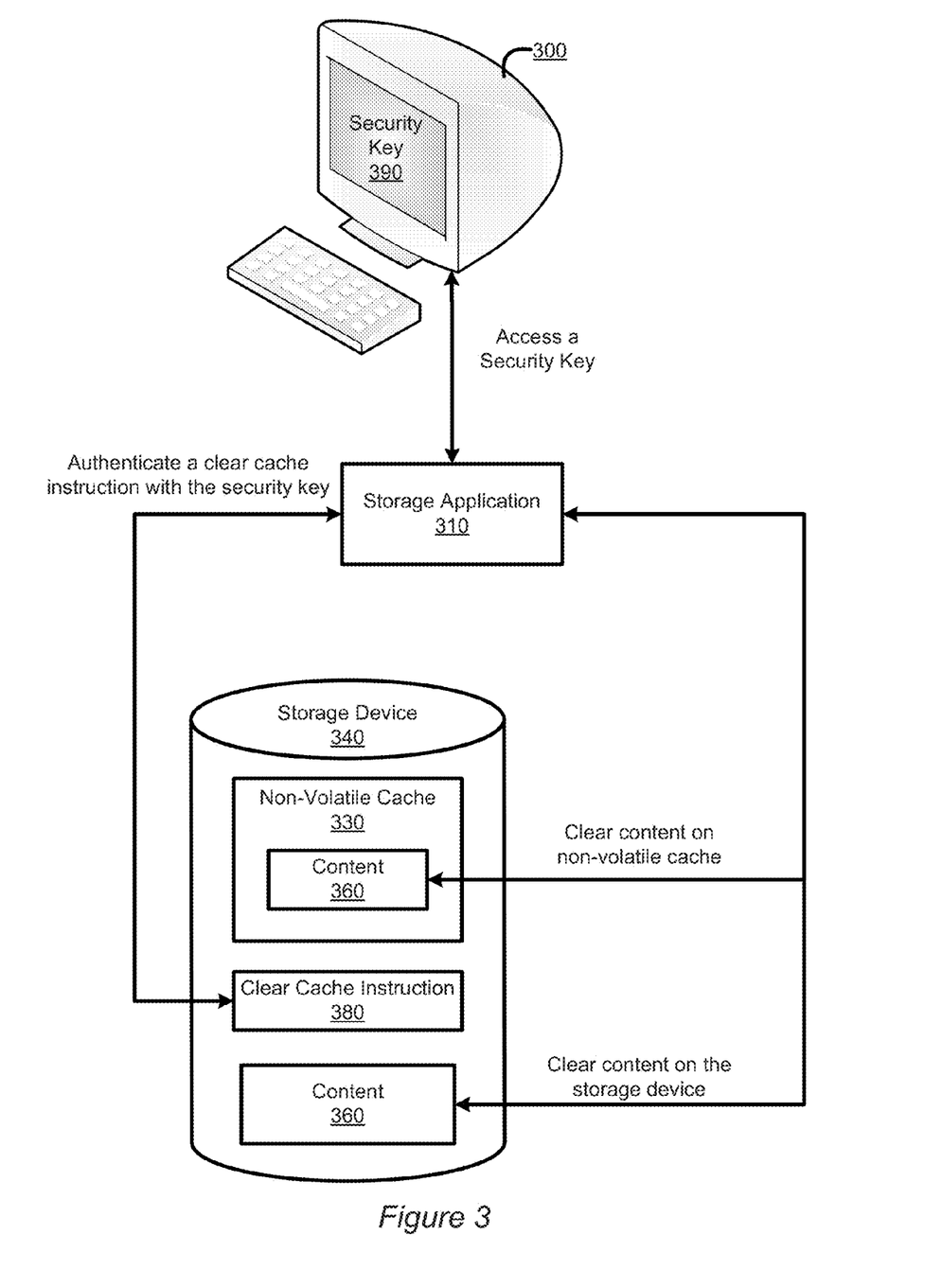
FIG. 3 illustrates a block diagram of a storage application managing a storage device and clearing content from the storage device according to an embodiment of the invention.

FIG. 3 illustrates a storage application 310 managing a storage device 340 and content 360 on the storage device 340 according to an embodiment of the invention. As shown in the present embodiment, one or more content 360 can be stored on a non-volatile cache 330 of the storage device 340 and/or on other areas of the storage device 340.

As a result, the storage application 310 can manage the storage device 340 by managing content 360 on the non-volatile cache 330 and content 360 outside of the non-volatile cache. When managing content 360, the storage application 310 can clear content 360 on a non-volatile cache 330 of the storage device 340. Additionally, the storage application 310 can clear content 360 from areas of the storage device 340 outside of the non-volatile cache 330.

As noted above, the storage application 310 clears content from the non-volatile cache 330 and/or from other areas of the storage device 340 in response authenticating a clear cache instruction 380. In one embodiment, as shown in FIG. 3, the storage application 310 has scanned for and found a clear cache instruction 380 on the storage device 340. In other embodiments, the clear cache instruction 380 can be stored on additional locations and can be accessed by the storage application 310 through a communication bus of a computing machine 300 and/or through a network interface of the computing machine 300.

In response to locating a clear cache instruction 380, the storage application 310 attempts to authenticate it. As noted above and as illustrated in FIG. 3, when authenticating the clear cache instruction 380, the storage application 310 can access a security key 390. As illustrated in FIG. 3, the security key 390 can be stored on a computing machine 300 coupled to the storage device 340. In another embodiment, the security key 390 can be stored on the storage device 340. In other embodiments, the security key 390 can be stored on additional locations accessible to the storage application 310 in addition to and/or in lieu of those noted above and illustrated in FIG. 3.

The security key 390 is a software or hardware security device configured to authenticate the clear cache instruction 380. As noted above, the security key 390 can include an encrypted block of data which can be used by the storage application 310 to decrypt and authenticate the clear cache instruction 380. In another embodiment, the security key 390 can include one or more sequence of numbers and/or characters or the security key 390 can include one or more algorithms.

In one embodiment, when authenticating the clear cache instruction 380, the storage application 310 compares the security key 390 to the clear cache instruction 380. If the storage application 310 determines that the security key 390 matches the clear cache instruction 380 or if the security key 390 can be utilized to unlock the clear cache instruction 380, the storage application 310 will determine that the clear cache instruction 380 has successfully been authenticated. In other embodiments, the clear cache instruction 380 can be authenticated using additional methods in addition to and/or in lieu of those noted above.

If the clear cache instruction 380 is successfully authenticated, the storage application 310 will proceed to clear content from the non-volatile cache 330. In another embodiment, the storage application 310 can send an instruction for the storage device 340 to clear content from the non-volatile cache 330. In one embodiment, clearing content 360 from the non-volatile cache 330 includes the storage application 310 or the storage device 340 deleting all of the content 360 from the non-volatile cache 330. In another embodiment, clearing content 360 from the non-volatile cache 330 includes overwriting the content 360. The content 360 can be overwritten with 0's, any additional values, and/or data.

In one embodiment, after the content 360 from the non-volatile cache 330 has been cleared, the storage application 310 and/or the storage device 340 can additionally clear any content 360 found within the storage device 340. Similar to the method noted above, the storage device 340 and/or the storage device 310 can clear the content 360 by deleting the content 360 or by overwriting the content 360.

In other embodiments, if the clear cache instruction 380 is not successfully authenticated using the security key 390, the clear cache instruction 380 will not be executed on the non-volatile cache 330 and content 360 on the non-volatile cache 330 will not be cleared. However, the content 360 on areas of the storage device 340 outside of the non-volatile cache 330 can continue to be cleared by the storage application 310 and/or by the storage device 340.

Figure 4:
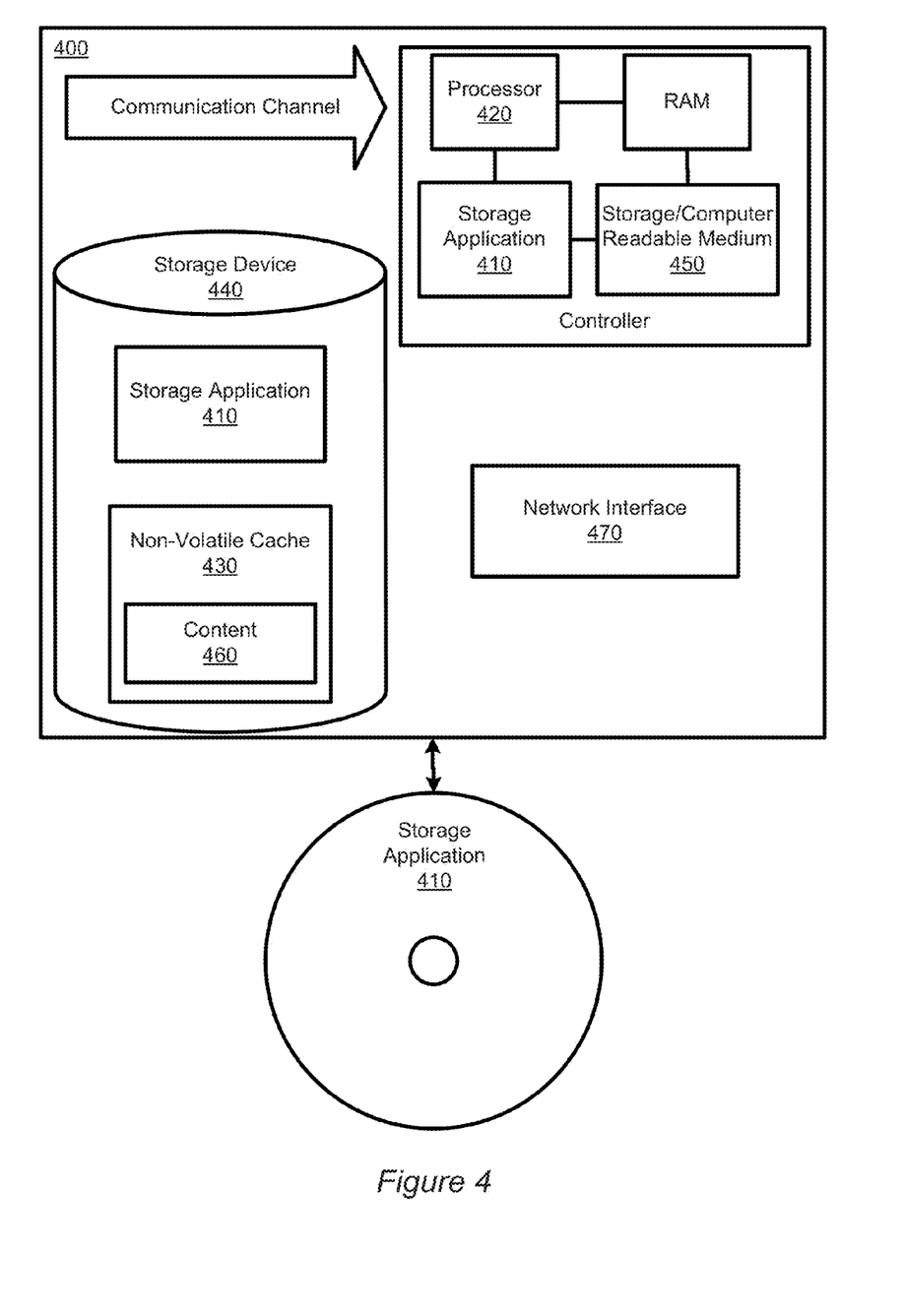
FIG. 4 illustrates a computing machine with an embedded storage application and a storage application stored on a removable medium being accessed by the computing machine according to an embodiment of the invention.

FIG. 4 illustrates a computing machine 400 with an embedded storage application 410 and a storage application 410 stored on a removable medium being accessed by the computing machine 400 according to an embodiment of the invention. For the purposes of this description, a removable medium is any tangible apparatus that contains, stores, communicates, or transports the application for use by or in connection with the computing machine 400. As noted above, in one embodiment, the storage application 410 is firmware that is embedded into one or more components of the computing machine 400 or the storage device 440 as ROM. In other embodiments, the storage application 410 is a software application which is stored and accessed from a hard drive, a compact disc, a flash disk, a network drive or any other form of computer readable medium that is coupled to the computing machine 400.

Figure 5:
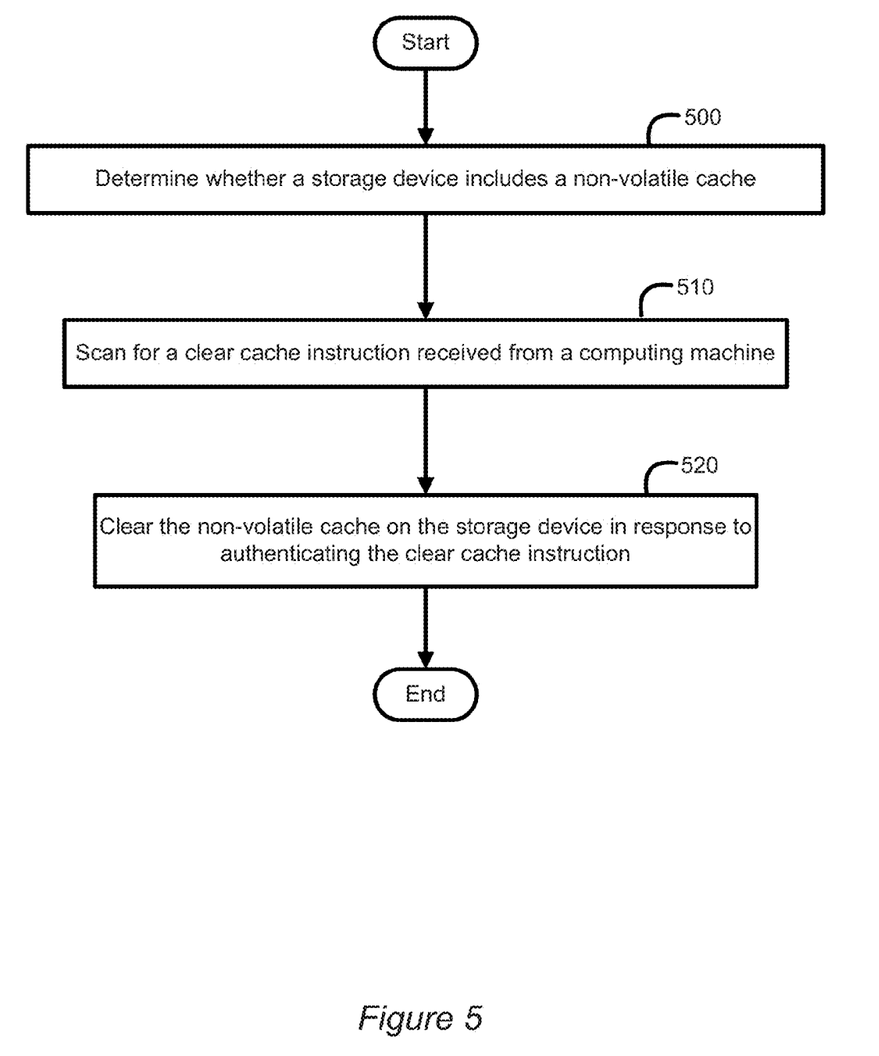
FIG. 5 is a flow chart illustrating a method for managing a storage device according to an embodiment of the invention.

FIG. 5 is a flow chart illustrating a method for managing a storage device according to an embodiment of the invention. The method of FIG. 5 uses a computing machine coupled to a storage device, a non-volatile cache of the storage device, a processor, and a storage application. In other embodiments, the method of FIG. 5 uses additional components and/or devices in addition to and/or in lieu of those noted above and illustrated in FIGS. 1, 2, 3, and 4.

As noted above, a processor initially sends one or more instructions for a storage application to access a storage device and determine whether the storage device includes a non-volatile cache 500. The storage application is an application configured to manage the storage device and/or content on the storage device. Additionally, the storage application can be firmware embedded onto the computing machine and/or the storage device. In other embodiments, the storage application is an application accessible to the computing machine through a network interface or a computer readable medium.

The storage application will initially access the storage device and scan the storage device for a cache. If a cache is found, the storage application will proceed to determine whether the cache is a non-volatile cache. As noted above, a non-volatile cache is an area of the storage device which includes non-volatile memory. Additionally, the non-volatile cache can be a media cache configured to store content. In one embodiment, the non-volatile cache does not store any instructions.

When determining whether a cache is a non-volatile cache, the storage application scans the cache for a label or non-volatile memory. The label can be from a user, the computing machine, and/or from a manufacturer of the storage device. Additionally, the label can specify whether a cache is a non-volatile cache. If the cache is labeled as a non-volatile cache or if the cache includes non-volatile memory, then the storage application will identify the cache as a non-volatile cache.

Once a non-volatile cache has been found on the storage device, the storage application will proceed to scan for a clear cache instruction 510. As noted above, the clear cache instruction is an executable instruction or command which is executed by the processor and/or the storage application. When executed, the clear cache instruction will clear content from the non-volatile cache. In another embodiment, the clear cache instruction can additionally be utilized to clear content from other areas of the storage device outside of the non-volatile cache.

The clear cache instruction can be sent by a user, the computing machine, a device or component of the computing machine, and/or another device coupled to the computing machine. Additionally, the clear cache instruction can be stored on the storage device, a component or device of the computing machine, and/or at another location accessible to the storage application.

If a clear cache instruction is found, the storage application will attempt to authenticate the instruction before executing it. As noted above, the clear cache instruction can be authenticated using a security key accessible to the storage application. The security key is a hardware and/or software security device configured to authenticate and/or unlock the clear cache instruction. Additionally, the security key can be accessed from the storage device, the computing machine, and/or from another location accessible to the storage application.

In one embodiment, the security key includes one or more sequence of numbers and/or characters. In another embodiment, the security key includes one or more encryption algorithms or the security key can include a hardware and/or software token. In other embodiments, the security key be additional software and/or hardware security devices configured to authenticate and/or unlock a clear cache instruction.

Utilizing the security key, the storage application will attempt to match an encryption of the clear cache instruction with the security key or the storage application will attempt to unlock the clear cache instruction with the security key. If the security key includes a matching, sequence, algorithm, and/or token which matches the clear cache instruction, the storage application will have succeeded in authenticating the clear cache instruction.

Once the clear cache instruction has been authenticate, the storage application can proceed to clear the non-volatile cache on the storage device 520. As noted above, when clearing the non-volatile cache, the storage application can delete one or more content found on the non-volatile cache. In another embodiment, the storage application can overwrite one or more of the content.

As noted above, one or more content are files which can be stored on the non-volatile cache or on other areas of the storage device. In one embodiment, one or more of the files include user data, media files, and/or system files. Additionally, one or more of the content does not include the clear cache instruction or any other instructions.

In one embodiment, the storage application can additionally access other areas of the storage device and clear any other content found outside of the non-volatile cache. In other embodiments, if the clear cache instruction is not successfully authenticated, the storage application can skip clearing content from the non-volatile cache and proceed to clear content from areas of the storage device outside of the non-volatile cache. The method is then complete or storage application can continue to scan for a clear cache instruction and manage the storage device in response to authenticating the clear cache instruction. In other embodiments, the method of FIG. 5 includes additional steps in addition to and/or in lieu of those depicted in FIG. 5.

Figure 6:
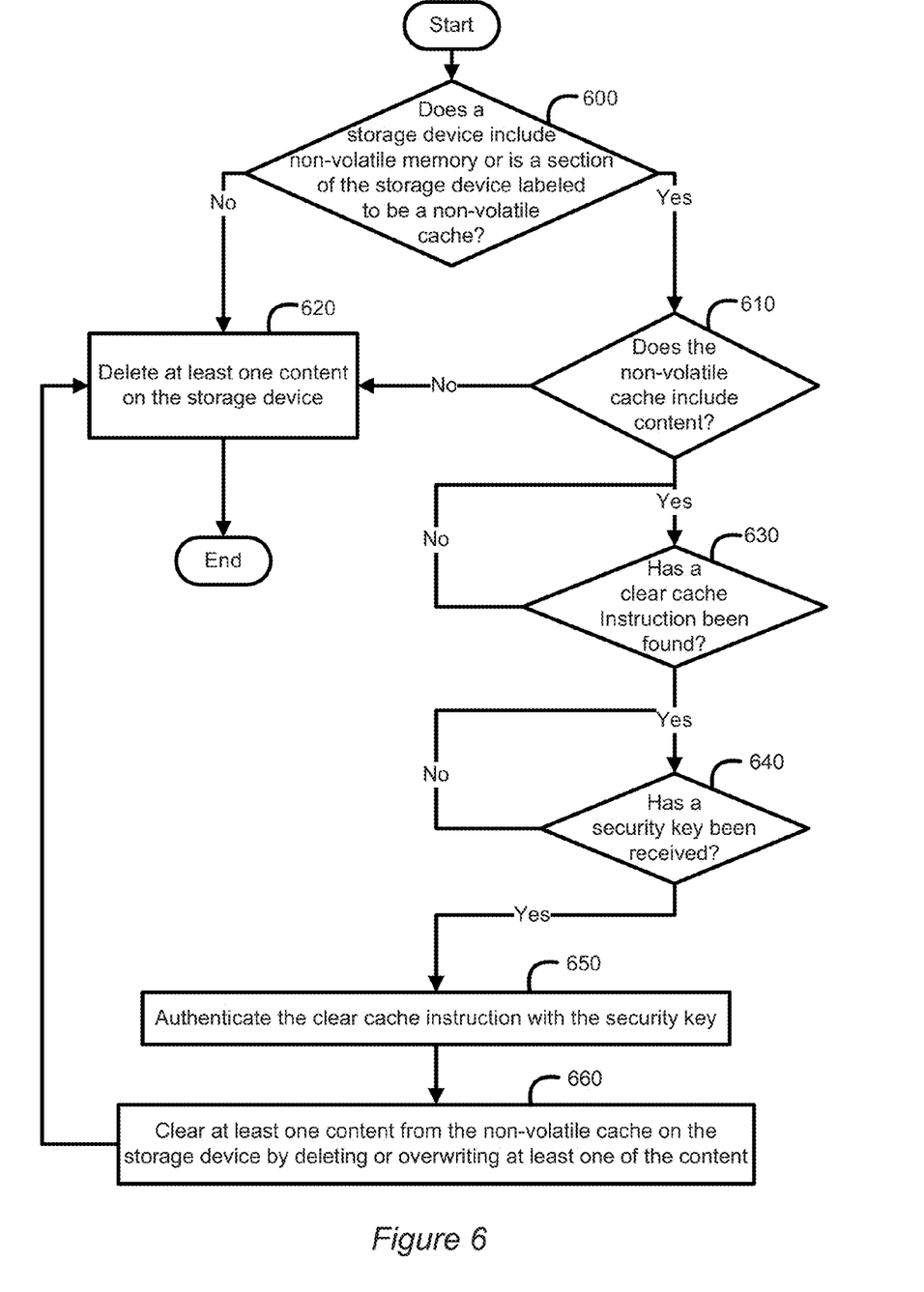
FIG. 6 is a flow chart illustrating a method for managing a storage device according to another embodiment of the invention.

FIG. 6 is a flow chart illustrating a method for managing a storage device according to another embodiment of the invention. Similar to the computer implemented method of FIG. 5, the method of FIG. 6 uses a computing machine coupled to a storage device, a non-volatile cache of the storage device, a processor, and a storage application. In other embodiments, the method of FIG. 5 uses additional components and/or devices in addition to and/or in lieu of those noted above and illustrated in FIGS. 1, 2, 3, and 4.

As noted above, a storage application can initially be configured by a processor of a computing machine to determine whether a storage device includes non-volatile memory or if a section of the storage device is labeled to be a non-volatile cache. The storage device is a device or component configured to couple to the computing machine and store one or more content. Additionally, the storage device can include one or more cache. Further, one or more of the cache can be a non-volatile cache.

When determining whether the storage device includes a non-volatile cache, the storage application can access a cache on the storage device and scan a label found in the cache or the storage device. Additionally, the storage device can determine whether the cache includes non-volatile memory. If the cache is labeled as a non-volatile cache or if the cache includes non-volatile memory, the storage application will determine that the storage device includes a non-volatile cache 600.

In one embodiment, if the storage application determines that the storage device does not include a non-volatile cache, the storage device can proceed to scan the storage device for any content. The storage application will then proceed to delete or clear at least one content from the storage device 620.

As noted above, one or more content can be stored on the storage device. Additionally, one or more of the content can be stored on a non-volatile cache or other areas of the storage device. In one embodiment, one or more of the cache includes user data, media files, and/or system files. In another embodiment, the content stored on the non-volatile cache does not include any instructions. In other embodiments, the content can include or exclude additional file types in addition to and/or in lieu of those noted above.

In another embodiment, if the storage device determines that the storage device does include a non-volatile cache, the storage application can continue to determine whether the non-volatile cache includes any content 610. When determining whether the non-volatile cache includes any content, the storage application can search one or more areas and/or sectors of the non-volatile cache for user data, media files, and/or system files.

If the storage application does not find any content on the non-volatile cache, the storage application will proceed to scan other areas of the storage device outside of the non-volatile cache for any content. The storage application will then delete or clear at least one content from the storage device 620. In another embodiment, if the storage device determines that the non-volatile cache includes content, the storage application will proceed to scan for a clear cache instruction and determine whether a clear cache instruction has been found 630.

As noted above, the clear cache instruction is an executable instruction or command which can be executed on the non-volatile cache. In another embodiment, the clear cache instruction can additionally be executed on the storage device. In one embodiment, the clear cache instruction is stored on an area of the storage device outside of the non-volatile cache. In another embodiment, the clear cache instruction is accessed from another location on the computing machine or from a device coupled to the computing machine through a wireless or through a wired connection.

When executed, the clear cache instruction can clear the non-volatile cache. In one embodiment, when executing the clear cache instruction, the storage device can additionally be cleared as well. If a clear cache instruction is not found, the storage application will continue to scan the storage device, the computing machine, and/or other additional components and/or devices coupled to the computing machine for the clear cache instruction 630.

Once a clear cache instruction has been found, the storage application can scan for a security key 640. The security key is a hardware and/or software device configured to authenticate and/or grant access to executing the clear cache instruction. When scanning for the security key, the storage application can scan the storage device, one or more components and/or devices of the computing machine, and/or another device coupled to the computing machine for the security key.

If the security key is not found, the storage application will continue to scan for the security key 640. Once the security key has been found, the storage application will proceed to authenticate the clear cache instruction with the security key. As noted above, when authenticating the clear cache instruction, the storage application can determine whether an encryption of the clear cache instruction matches the security key or if the security key can be utilized to unlock or decrypt the clear cache instruction.

Once the clear cache has been instructed, the storage application can proceed to clear at least one of the content from the non-volatile cache by deleting and/or by overwriting at least one of the content 660. In one embodiment, the storage application additionally accesses other areas of the storage device and proceeds to delete and/or clear content from the storage device 620.

If the storage device includes more than one cache or non-volatile cache, the storage application can repeat the above disclosed method for each of the non-volatile cache. The method is then complete or the storage application can continue to scan for a clear cache instruction and proceed to manage the storage device and the non-volatile cache on the storage device in response to authenticating the clear cache instruction. In other embodiments, the method of FIG. 6 includes additional steps in addition to and/or in lieu of those depicted in FIG. 6.

By determining whether a storage device includes a non-volatile cache, content on the storage device and the non-volatile cache can conveniently be managed. Additionally, by clearing one or more content on the non-volatile cache in response to authenticating a clear cache instruction received from a computing machine, security can be increased for the storage device and the computing machine. As a result, a secure and user friendly experience can be created for a user.

What is claimed is:

1. A method for managing a storage device comprising:
   determining whether the storage device includes a non-volatile cache;
   scanning for a clear cache instruction received from a computing machine;
   receiving a security key; and
   clearing the non-volatile cache on the storage device in response to authenticating the clear cache instruction with the security key.

2. The method of claim 1 further comprising determining whether the non-volatile cache includes at least one content.

3. The method of claim 2 further comprising deleting content from the storage device if the storage device does not include a non-volatile cache.

4. The method of claim 1 wherein the determining whether the storage device includes a non-volatile cache includes at least one from the group consisting of determining whether the storage device includes non-volatile memory and determining whether a section of the storage device is labeled to be a non-volatile cache.

5. The method of claim 1 wherein clearing the non-volatile cache includes deleting content from the non-volatile cache.

6. The method of claim 1 wherein clearing the non-volatile cache includes overwriting content on the non-volatile cache.

7. A computing machine comprising:
a processor;
a storage device configured to include a non-volatile cache;
a storage application executable by the processor from a storage medium and configured to:
determine whether the storage device includes the non-volatile cache;
scan for a clear cache instruction;
receive a security key; and
clear content from the non-volatile cache on the storage device in response to authenticating the clear cache instruction with the security key.

8. The computing machine of claim 7 wherein the clear cache instruction is stored in an area of the storage device that is outside the non-volatile cache.

9. The computing machine of claim 7 wherein the non-volatile cache is a media cache configured to include content to be written to the storage device.

10. The computing machine of claim 7 wherein the content includes at least one from the group consisting of user data, system files, and media files.

11. A computer-readable program in a non-transitory computer-readable medium comprising:
a storage application configured to determine whether a storage device includes a non-volatile cache;
wherein the storage application is additionally configured to scan for a clear cache instruction and a security key; and
wherein the storage application is further configured to clear the non-volatile cache on the storage device in response to authenticating the clear cache instruction with the security key.

12. The computer-readable program of claim 11 wherein the storage application is additionally configured to clear content from the storage device and outside of the non-volatile cache if the clear cache instruction is not authenticated with the security key.

13. The computer-readable program of claim 11 wherein the clear cache instruction is received from at least one from the group consisting of a computing machine coupled to the storage device and another device coupled to the computing machine.

* * * * *